(12) United States Patent  (10) Patent No.: US 7,437,866 B2
Smith et al.  (45) Date of Patent: Oct. 21, 2008

(54) SENSOR FOR BALE SHAPE MONITORING IN ROUND BALERS

(75) Inventors: Kevin M. Smith, Narvon, PA (US); John H. Posselius, Ephrata, PA (US); Christopher A. Foster, Akron, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 11/613,732

(22) Filed: Dec. 20, 2006

(65) Prior Publication Data

US 2008/0148703 A1   Jun. 26, 2008

(51) Int. Cl.
*A01D 39/00* (2006.01)
*A01D 43/02* (2006.01)
*A01D 75/00* (2006.01)

(52) U.S. Cl. ...................................... 56/341
(58) Field of Classification Search ............ 100/4, 100/5, 13, 87, 99, 102; 53/67, 118, 589, 53/64, 399, 116, 587, 504; 56/341
See application file for complete search history.

(56) References Cited

U.S. PATENT DOCUMENTS

| | | | |
|---|---|---|---|
| 4,228,638 A | 10/1980 | Rabe et al. | |
| 4,624,179 A * | 11/1986 | Yves et al. | 100/4 |
| 4,674,403 A * | 6/1987 | Bryant et al. | 100/4 |
| 4,850,271 A | 7/1989 | White et al. | |
| 4,924,405 A * | 5/1990 | Strosser et al. | 700/17 |
| 5,182,987 A | 2/1993 | Viaud | |
| 5,231,828 A | 8/1993 | Swearingen et al. | |
| 5,388,504 A * | 2/1995 | Kluver | 100/4 |
| 5,408,817 A | 4/1995 | Wagstaff | |
| 5,551,218 A * | 9/1996 | Henderson et al. | 53/504 |
| 5,913,801 A | 6/1999 | Bottinger et al. | |
| H1819 H | 12/1999 | Anderson et al. | |
| 6,050,074 A | 4/2000 | Clostermeyer | |
| 6,557,336 B2 | 5/2003 | Lucand et al. | |
| 6,966,162 B2 | 11/2005 | Viaud et al. | |
| 6,981,352 B2 * | 1/2006 | Chow et al. | 53/64 |
| 2001/0018821 A1 * | 9/2001 | Chow | 53/589 |
| 2002/0029542 A1 * | 3/2002 | Davis et al. | 53/399 |
| 2004/0016204 A1 * | 1/2004 | Chow et al. | 53/67 |
| 2004/0182043 A1 | 9/2004 | Viaud et al. | |
| 2006/0048654 A1 * | 3/2006 | Biziorek | 100/87 |

* cited by examiner

*Primary Examiner*—Árpád Fábián-Kovács
(74) *Attorney, Agent, or Firm*—Patrick M. Sheldrake; John William Stader; Michael G. Harms

(57) ABSTRACT

A bale shape indicator includes a sensor configured for use with a substantially cylindrical bale being formed, to indicate, in a non-contacting manner, the presence of crop components corresponding to a predetermined area of an end region of the bale. The indications are capable of being manipulated to determine a density value for the end region of the bale.

20 Claims, 8 Drawing Sheets

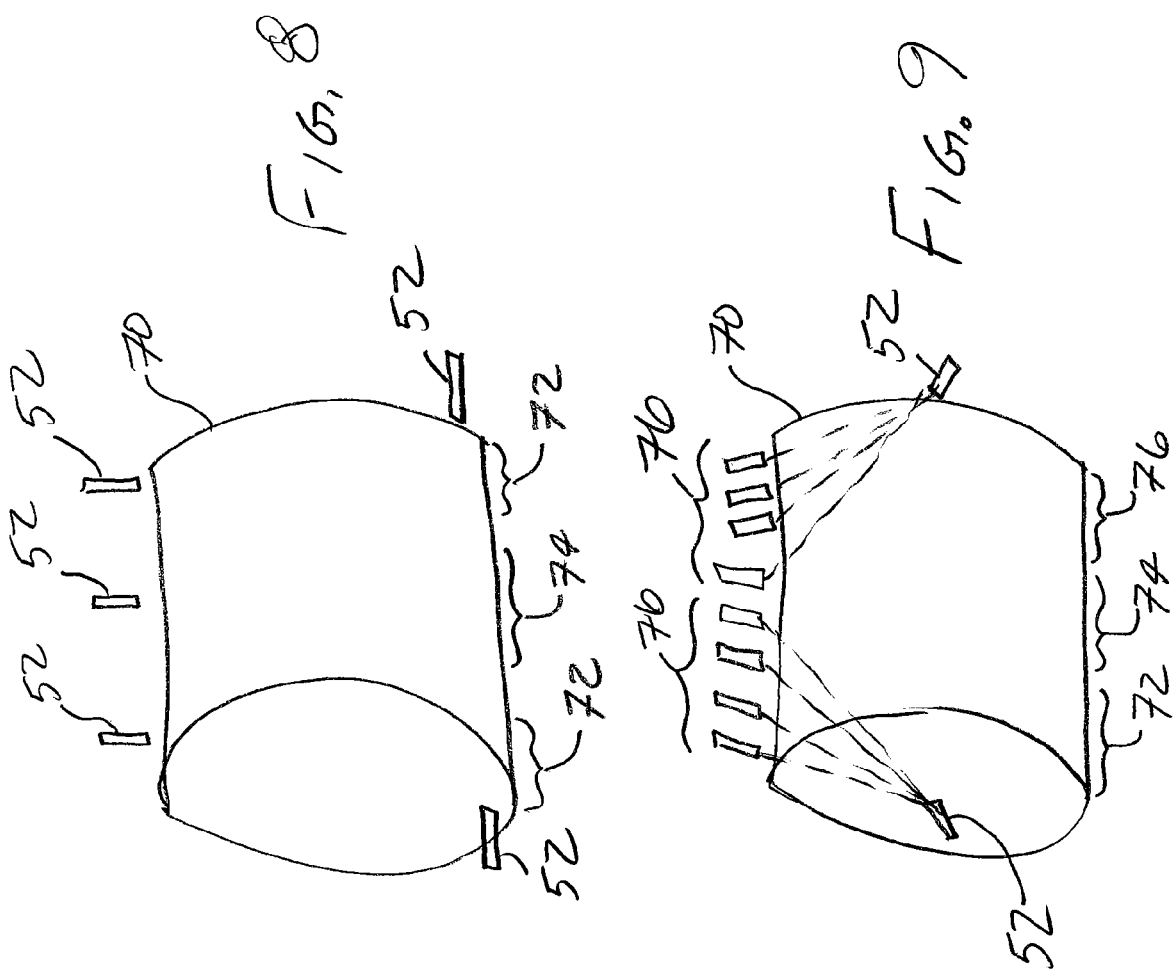

SENSOR FOR BALE SHAPE MONITORING IN ROUND BALERS

FIELD OF THE INVENTION

The present invention relates generally to balers for forming substantially cylindrical bales or round cross section, and, more particularly, to sensors for use with balers for shaping the bales.

BACKGROUND OF THE INVENTION

Balers, for example, round balers, generally have a bale-forming chamber defined by a pair of opposing side walls associated with an array of side-by-side belts, transverse slats trained on chains, a plurality of rollers or a combination of these various elements, e.g., rollers and belts. During field operation, windrowed crop material, such as hay, is picked up from the ground and fed into a chamber of fixed or variable diameter. The hay is then rolled into a substantially cylindrical package, wrapped with twine, net or the like and ejected onto the ground for subsequent handling.

Because it is common for windrows of crop material to be uneven and typically narrower than the width of the bale-forming chamber, it is necessary for the operator of some prior art balers to observe the shape of the bale being formed and weave the baler in a generally zigzag pattern to uniformly distribute hay across the bale being formed and thereby avoid poorly shaped bales. This approach relies on the experience of the operator to determine when to laterally shift the position of the baler. The lack of exactness, inability to observe the bale shape, reliance on operator skill and operator fatigue each contribute to the possibility of improper feeding of crop material, causing misshaped bales.

In bales formed in belt type balers, when a substantially uniform diameter is not maintained, improper tracking can occur, resulting in belt jamming and damage to the baler. In addition, the uneven shape of the bale causes low density areas on the bale periphery, typically along one end of the bale, which could result in premature deterioration of the bale during field storage. That is, where the bale is exposed to weather extremes, the low density area does not shed water as well as an evenly balanced and uniformly compacted area.

In order to achieve substantially cylindrical bales, current balers use systems that employ mechanical sensors, which measure the amount of crop at the end regions of the bale, and then indicate to the operator the approximate density along the end regions of the bale. While mechanical systems are functionally acceptable, the mechanical linkages used to measure the density contain a large number of components, many of which are maintained in contact with either belts or the bale surface. As a result, the durability of the components and resultant reliability of these systems are reduced.

What is needed is a baler that includes components which operate in a non-contacting manner to calculate the density along the edge regions of the bale in order to monitor the cylindrical profile of the bale.

SUMMARY OF THE INVENTION

The present invention relates to a rotary baler for forming cylindrical bales composed of a harvested crop, the rotary baler of the type having a bale-forming chamber which is expandable during bale formation. The rotary baler includes at least two sensors disposed in the chamber. Each sensor is configured to indicate the presence of crop components corresponding to a predetermined area along an end region of the bale. A controller is configured to receive the indications from each sensor and calculate a density value for each end region of the bale to permit monitoring of the cylindrical profile of the bale.

The present invention further relates to a bale shape indicator including a sensor configured for use with a substantially cylindrical bale being formed, to indicate, in a non-contacting manner, the presence of crop components corresponding to a predetermined area of an end region of the bale. The indications are capable of being manipulated to determine a density value for the end region of the bale.

The present invention yet further relates to a method of forming substantially cylindrical bales in a round baler of the type having a crop pickup and a bale-forming chamber which is expandable during bale formation. The method includes the steps of positioning the round baler to pick up crop material with the pickup and feeding the picked up crop material into the expandable bale-forming chamber. The method further includes sensing, in a non-contacting manner in the bale-forming chamber, the presence of crop components corresponding to a predetermined area for each of opposed end regions of the bale. The method further includes manipulating the sensed presence of crop components to determine a density value for each end region of the bale. The method further includes comparing the density values and repositioning the baler in response to the comparison of density values to attain or maintain a desired correlation between the density values.

An advantage of the present invention is that the reliability/durability of the sensors and/or system employing the sensors is improved.

A further advantage of the present invention is that less expensive sensors can be used, reducing component costs.

A still further advantage of the present invention is that it permits formation of bales having more uniform density.

A still yet further advantage of the present invention is that it permits the calculation of density of bale ends without the sensors contacting the bales and/or belts.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIGS. 8 and 9 are embodiments of sensor arrangements used with the present invention.

Wherever possible, the same reference numbers will be used throughout the drawings to refer to the same or like parts.

DETAILED DESCRIPTION OF THE INVENTION

Figure 1:
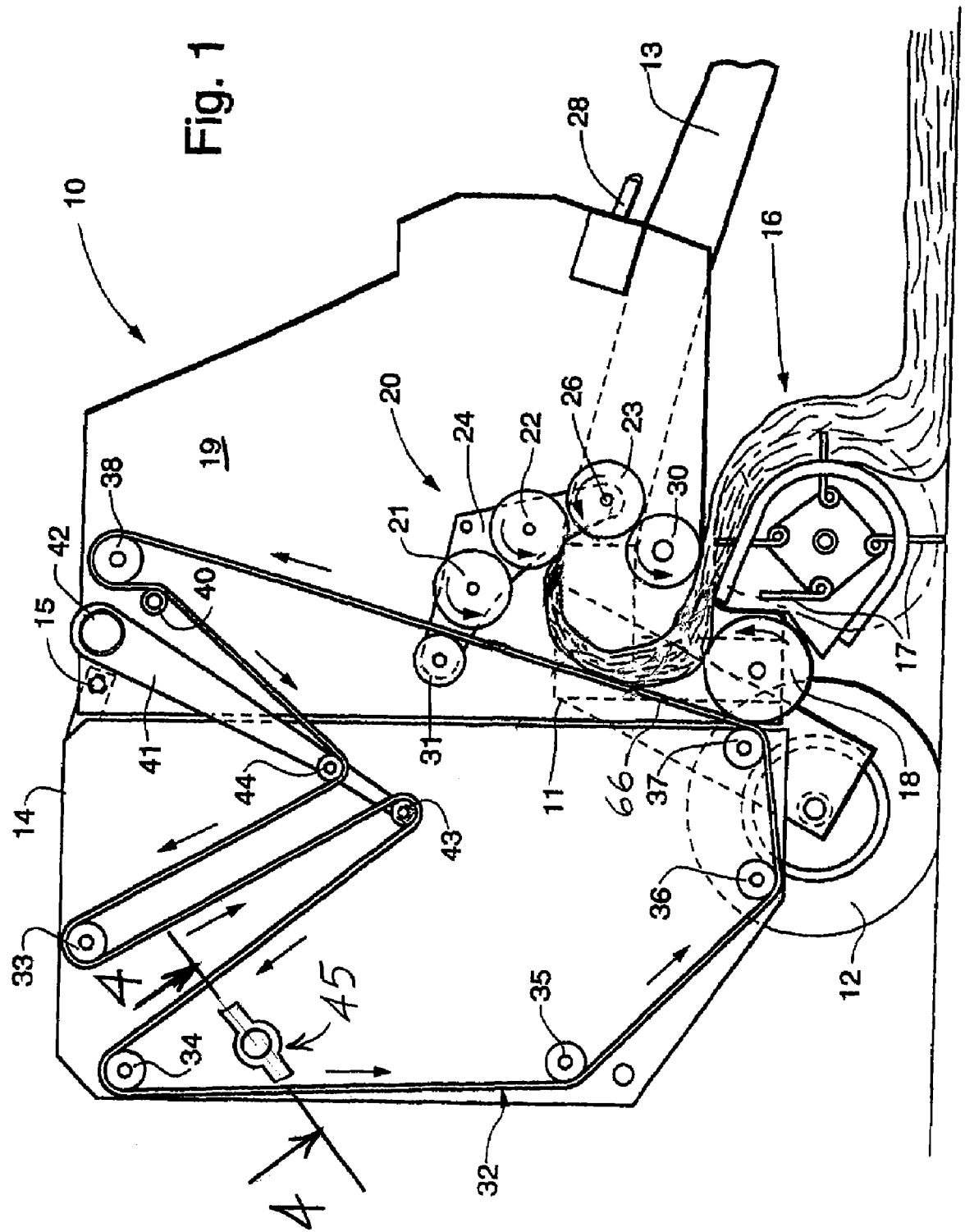
FIG. 1 is a side elevational view of a round baler employing the present invention.

Referring to the drawings for a description of a baler which employs the present invention, FIG. 1 shows a rotary or round baler 10 having an expandable chamber defined in part by belts and rollers, as disclosed in U.S. Pat. No. 4,870,812, issued Oct. 12, 1989 in the name of Richard E. Jennings, et al. Baler 10 has a main frame 11, including a pair of side walls 9, 19 (only side wall 19 shown), supported by a pair of wheels 12 (only one wheel 12 shown). As used herein, a rotary or round baler 10 is a baler that produces a substantially cylindrical bale having a substantially round or circular cross section. A forwardly mounted tongue 13 is provided on main frame 11 for connection to a tractor (not shown). Pivotally connected to a side wall 19 by a pair of stub shafts 15 is a tailgate 14 which is closed during bale formation. A pickup 16, mounted on main frame 11, includes tines 17 movable in a predetermined path to lift crop material from the ground and deliver it to a floor roller 18, rotatably mounted on main frame 11.

A chamber for forming bales is defined partly by a sledge assembly 20 comprising transversely extending rollers 21, 22, 23 journalled at their ends in a pair of spaced arms 24, one of which is shown. These arms 24 are pivotally mounted on stub shafts 26 for providing movement of sledge assembly 20 from the bale starting position shown in FIG. 1 through the partly full position shown in FIG. 2 to the full bale position shown in FIG. 3. Rollers 21, 22, 23 are driven in a counter-clockwise direction by conventional means coupled to a drive shaft 28. A starter roller 30, mounted on main frame 11, is also driven counter-clockwise. A freely rotatable idler roller 31, carried by arms 24, moves in an arcuate path with sledge assembly 20.

The bale-forming chamber is further defined by an apron 32 comprising a plurality of continuous side-by-side belts supported by guide rollers 33, 34, 35, 36, 37 rotatably mounted in tailgate 14. Apron 32 is also supported by drive roller 38, mounted on main frame 11. Although apron 32 passes between roller 21 and idler roller 31, it is in engagement only with idler roller 31 and not roller 21. Suitable coupling means (not shown) connected to drive shaft 28 provide rotation of drive roller 38 causing movement of apron 32 in the directions indicated by the arrows in FIGS. 1, 2 and 3. An additional guide roller 40 in the main frame 11 ensures proper engagement between apron 32 and drive roller 38. A pair of take up arms 41 (only one shown) is pivotally mounted on main frame 11 by a cross shaft 42 for movement between inner, intermediate and outer positions shown in FIGS. 1, 2 and 3, respectively. Take up arms 41, which carry additional guide rollers 43, 44 for supporting apron 32, are resiliently urged toward their inner positions (FIG. 1).

When the elements of round baler 10 are disposed as shown in FIG. 1, an inner course 66 of apron 32 extends between guide roller 37 and idler roller 31 to form the rear wall of the core starting chamber, while the inwardly facing surfaces of rollers 21, 22, 23 define in a general manner, a rearwardly inclined front wall. Floor roller 18 defines the bottom of the chamber, and with starter roller 30, provides an inlet for crop material.

Figure 2:
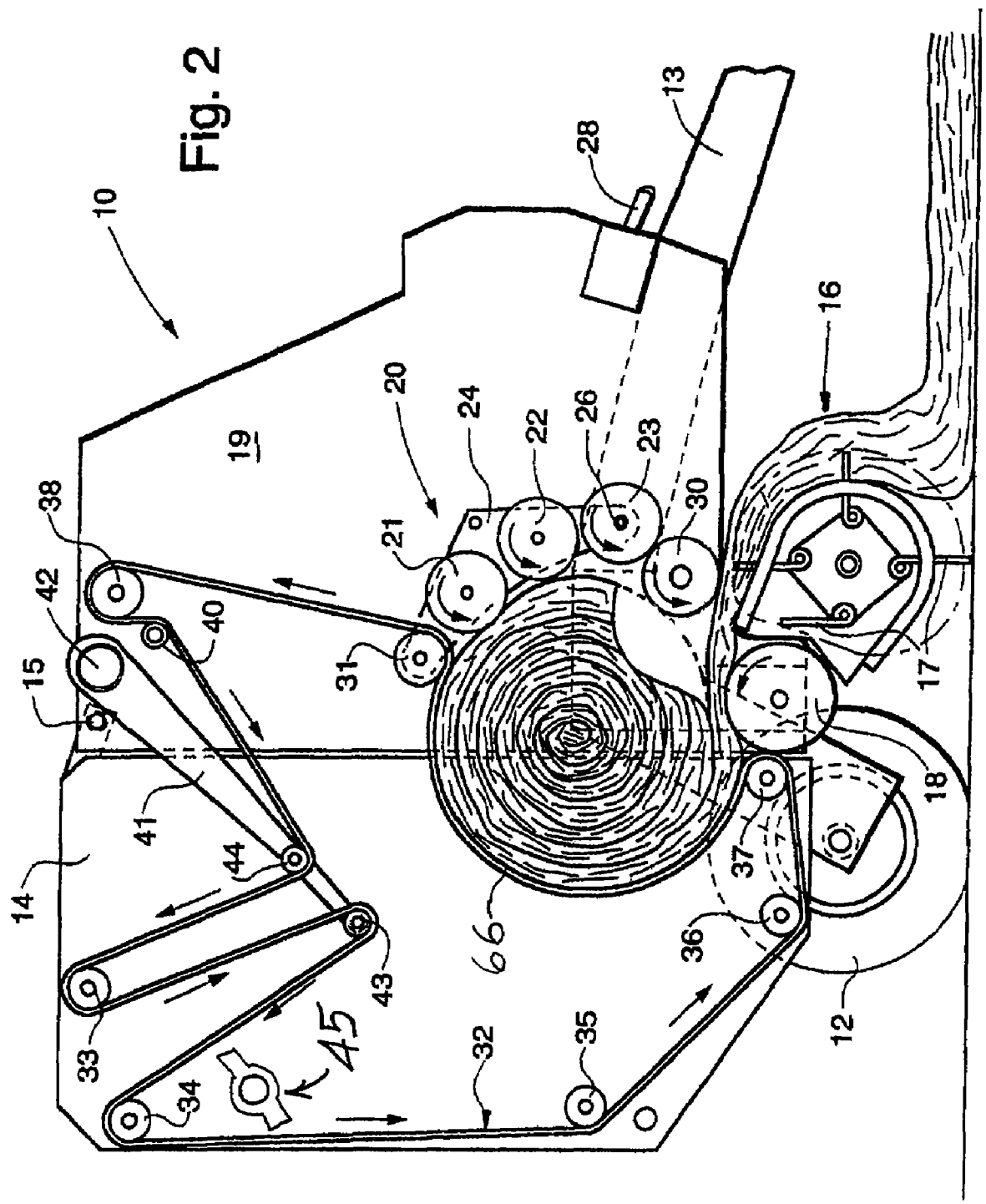
FIG. 2 is similar to FIG. 1 with the bale-forming chamber of the baler in its partly full position employing the present invention.

When round baler 10 travels across a field, pickup tines 17 lift crop material from the ground and deliver it through the inlet. The crop material is conveyed by floor roller 18 into engagement with apron inner course 66 (FIG. 1) which urges the crop material upwardly and forwardly into engagement with the rollers on sledge assembly 20. In this manner, crop material is coiled in a clockwise direction to start a bale core. Continued feeding of crop material into the chamber by pickup tines 17 causes apron inner course 66 to expand in length around a portion of the circumference of the bale core as the diameter increases (FIG. 2). Take up arms 41 rotate from their inner position, shown in FIG. 1, toward their outer position, shown in FIG. 3, to accommodate expansion of the inner course 66 of the apron in a well known manner, i.e., an outer course 68 of apron 32 is diminished in length while the inner course 66 increases a like amount. After a bale has been formed and wrapped, tailgate 14 is opened and the bale is ejected rearwardly. Subsequent closing of tailgate 14 returns the inner and outer courses 66, 68 of apron 32 to the locations shown in FIG. 1.

Figure 3:
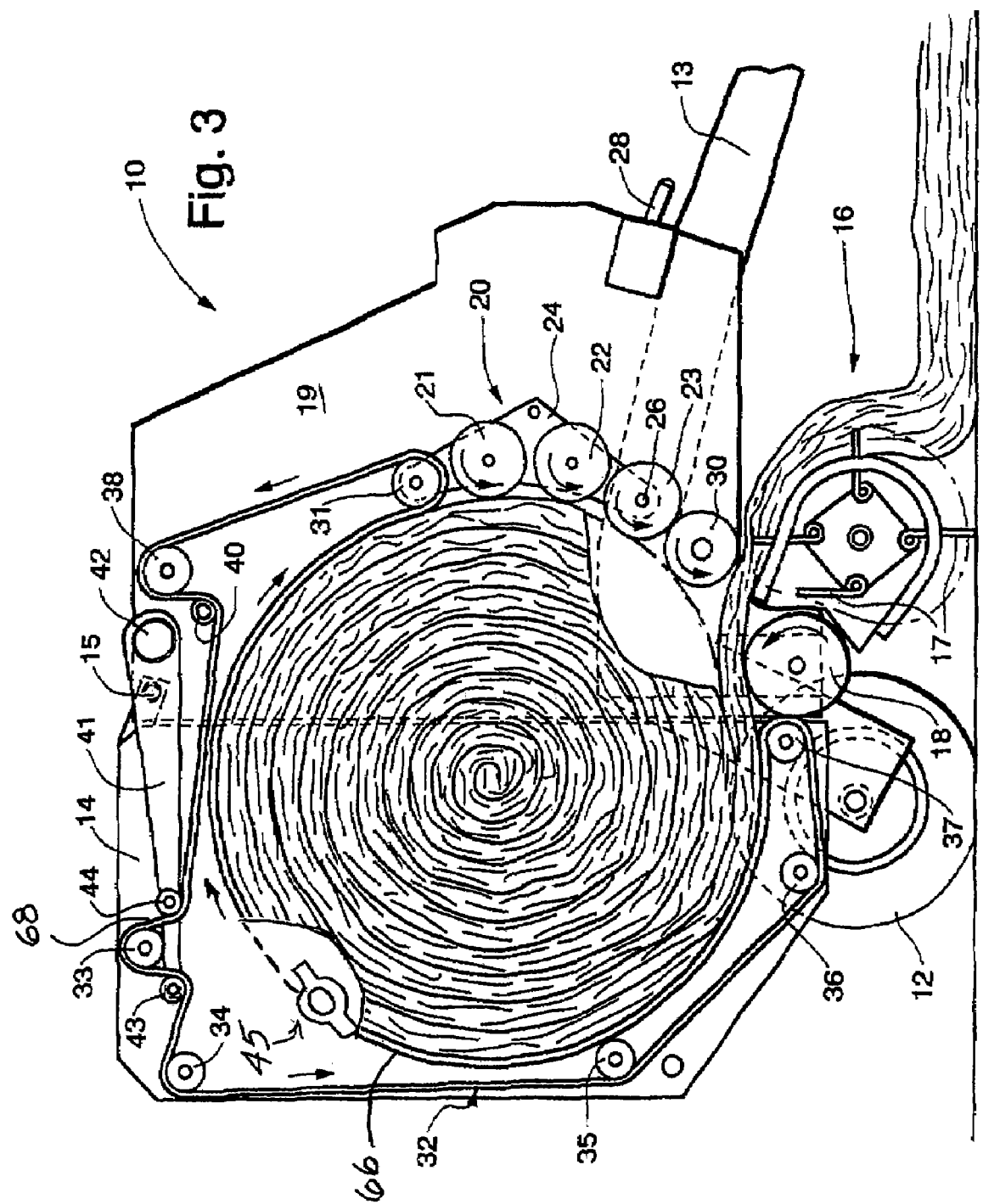
FIG. 3 is similar to FIG. 1 with the bale-forming chamber of the baler in its full bale position employing the present invention.

During bale formation, sledge assembly 20 moves between a bale starting position (FIG. 1) to a full bale position (FIG. 3). This movement causes idler roller 31 to move in an arcuate path while maintaining apron 32 in close proximity to roller 21, thereby allowing roller 21 to strip crop material from the belts and prevent or reduce significantly the loss of crop material between roller 21 and apron 32 during bale formation. Sledge assembly 20 is pushed outwardly towards its full bale position during bale formation as the crop material expands against rollers 21, 22, 23 and then subsequently is pulled inwardly by apron 32 to the position shown in FIG. 1.

Figure 4:
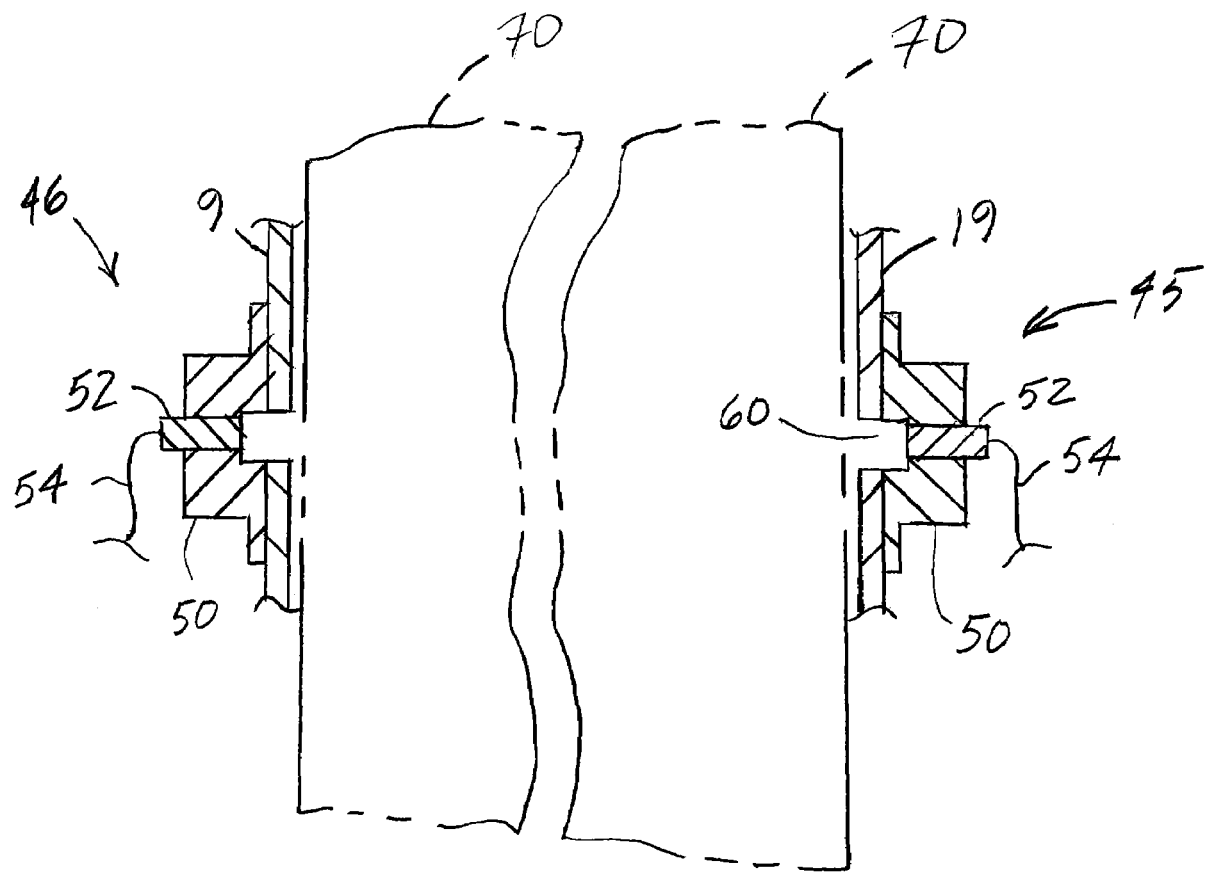
FIG. 4 is a cross section taken along line 4-4 of FIG. 1 employing the present invention.

With the above description and general operation of baler 10 as a background, attention is directed to a sensor assembly 45 mounted on side wall 19, shown in FIGS. 1-3. FIG. 4 shows a pair of sensor assemblies 45, 46, one of which is mounted on side wall 19, as shown in FIGS. 1-3, and the other of which is similarly mounted on the opposing side wall 9, not shown in FIGS. 1-3. For the purposes of this description, sensor assembly 45 will be described in detail but it is intended that like comments also apply to sensor assembly 46.

Figure 10:
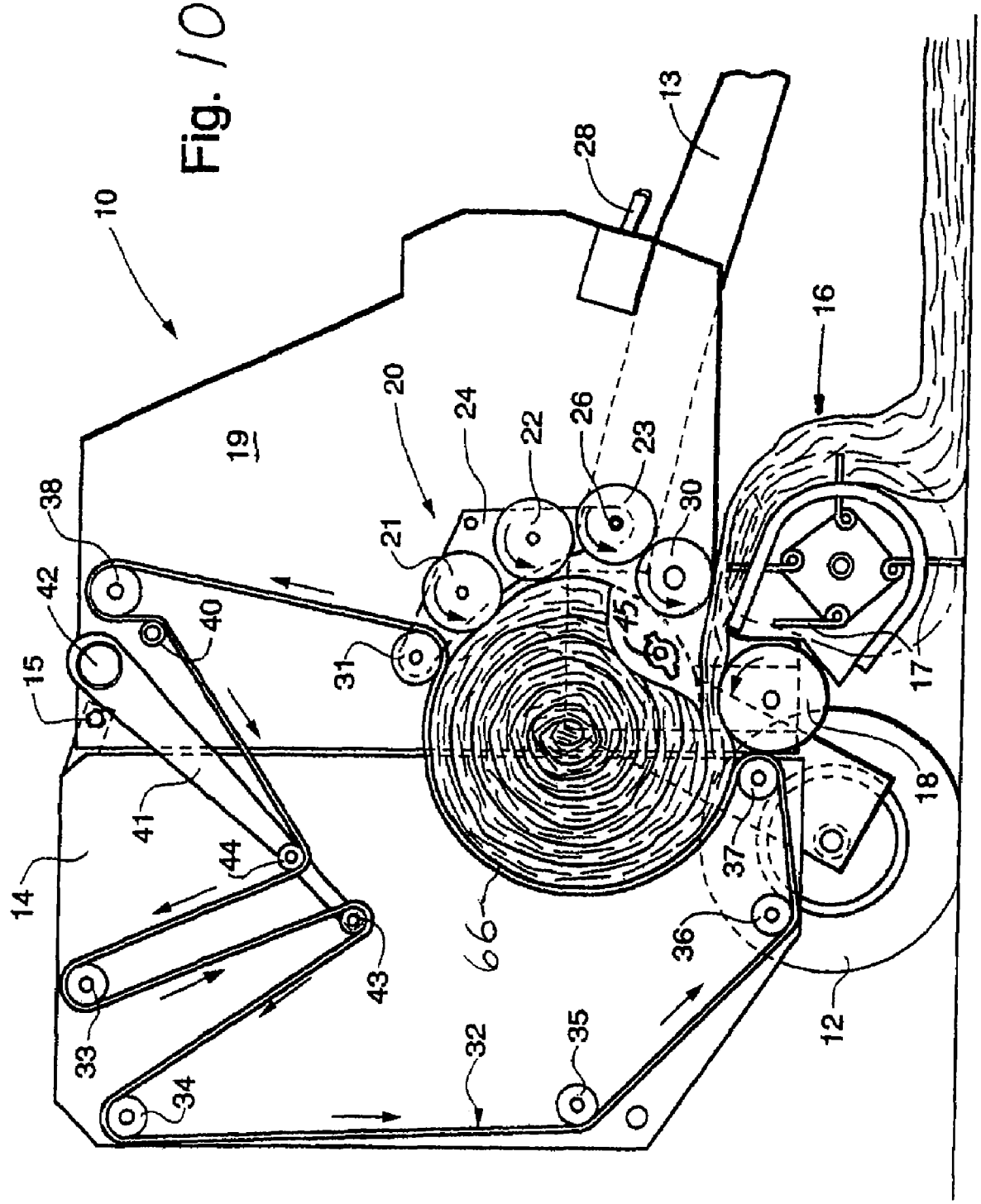
FIG. 10 is similar to FIG. 2 with the bale-forming chamber of the baler in its partly full position employing the present invention.

As shown in FIGS. 1-3 and 10, sensor assembly 45 is affixed to side wall 19 of frame 10 in a location which is always near the outer surface of the bale being formed regardless of bale size. However, it is to be understood that sensor assembly 45 can also be located in other positions in tailgate 14 or any other radially similar position or otherwise suitable position of baler 10 along side wall 19 facing an end of a forming bale in which a sensor 52 of sensor assembly 45 can sense a predetermined area along the periphery of the end of the bale substantially corresponding to the outer surface of the bale. For example, as shown in FIG. 10, sensor assembly 45 is disposed in a position capable of continuously monitoring the outer surface of a bale being formed. In one embodiment, as shown in FIG. 4, sensor assembly 45 includes a housing 50 that secures sensor 52, substantially surrounding sensor 52 to help protect sensor 52 from the environment of the bale-forming chamber. In one embodiment, sensor 52 emits a beam (not shown) containing a wavelength within the electromagnetic spectrum, such as waves in the ultrasonic or infrared spectra, i.e., an ultrasonic sensor or an infrared sensor, although an embodiment of sensor 52 may operate in the electromagnetic spectra outside of the ultrasonic and infrared ranges. Alternately, sensor 52 can emit other types of wavelengths within the electromagnetic spectrum, such as a laser or visual. In yet another embodiment, sensor 52 can emit multiple wavelengths, either one at a time or multiple wavelengths simultaneously. In a further embodiment, multiple sensors 52 are capable of emitting one or more wavelengths that can be different from each other. An opening 60 formed in side wall 19 and housing 50 permits sensor 52 a direct line of sight of the desired portion of forming bale 70 (FIG. 4) in which the beam (not shown) is emitted from sensor 52, the resulting beam reflection or absorption being sensed by the sensor 52. However, since the beam can be reflected, a direct line of sight is not required. Therefore, as used herein, the sensor indications may be obtained from either direct line of sight or indirect means, such as by reflection. The term forming bale as used herein is intended to refer to the bale being formed in the bale-forming chamber of the baler, although the term forming bale and bale may be used interchangeably.

Figure 5:
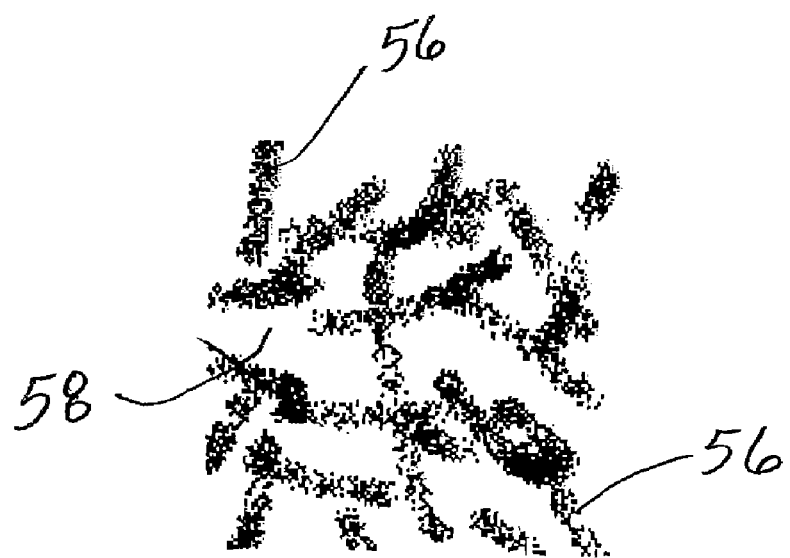
FIGS. 5 and 6 are partial side elevational views taken along an end of a forming bale of the present invention.
Figure 6:

As shown in FIG. 5, which is a simplified view of a portion adjacent the periphery of an end of a forming bale sensed by sensor 52, includes crop components 56 with voids 58 separating adjacent crop components 56. Crop components 56 include stalks, seeds or any other portion of the crop that can enter the baler and be formed into a bale. FIG. 5 shows a low density configuration of a portion adjacent the periphery of an end of a forming bale. In contrast, FIG. 6 shows a higher density configuration of a portion adjacent the periphery of an end of a forming bale, indicated by the increased number of crop components 56 and reduced size of voids 58. Sensor 52 can be configured to take into account different kinds of crops being baled and/or different moisture levels of the crop.

It is to be understood that sensor 52, such as but not limited to, an infrared sensor, can discriminate between objects and voids in close proximity to the sensor via reflectance, absorbance or other means.

In one embodiment of sensor 52 operation, sensor 52 is positioned facing an end of a forming bale, and more specifically, is in close proximity of an outer edge of an end of the forming bale. That is, as shown in FIGS. 1-3 by sensor assembly 45 in which sensor 45 is disposed and by FIG. 4, sensor 52 is placed in a non-contacting manner facing the junction between the end of the bale and the circumferential side of the bale. In other words, a distance separates sensor 52 from the forming bale 70 (FIG. 4), which continues to turn under normal baling operations. By virtue of sensor 52 facing forming bale 70 (FIG. 4) in a non-contacting manner, sensor 52 operates without the abrasive, or at least frictional conditions, normally associated with physically contacting the forming bale 70 in the bale-forming chamber.

It is to be understood that while sensor 52, as shown in FIG. 4, is in close proximity to and facing the ends and edges of a forming bale, as shown in FIG. 8, constructions of sensor 52 capable of similarly permitting the calculation of density values corresponding to end regions 72 of bale 70, while not requiring the sensor 52 to be in close proximity with the bale edges are also contemplated. It is also to be understood that while a single sensor 52 may be used with each end region 72 or central region 74 of bale 70, more than one sensor 52 can be used with each end region 72 or central region 74 of each bale 70. In one embodiment, one sensor 52 can be slidably connected to each side wall 19 and aligned with a slotted opening (not shown) to provide incremental monitoring of bale 70 during its formation.

As further shown in FIG. 8, sensors 52 can face the ends of bale 70, can be disposed along the circumference, for example, radially disposed with respect to the circumference of bale 70, or otherwise located at any position with respect to the exterior surface of bale 70. Sensors 52 can be used together, or in any combination to obtain density values. In addition, in one embodiment, as shown in FIG. 9, one or more sensor arrays 76 can be disposed along the exterior surface of bale 70, such as along end regions 72 and/or central region 74. Sensor 52, disposed as shown substantially along the center axis of each end of bale 70, can intermittently or continuously operate between sensor positions of sensor array 76. In one embodiment, sensor 52 operates sequentially from one end of the sensor array 76 to the opposite end of sensor array 76, and that sensor 52 operates in a similar manner with respect to the other sensor array 76. FIG. 9 shows a different arrangement of sensor operation in that sensor 52 emits a pulse and each of the sensors of the sensor array 76 is configured to receive the pulse emitted by sensor 52. However, it is appreciated that the arrangement could be reversed, i.e., each sensor of sensor array 76 emits a beam that is received by sensor 52.

Figure 7:
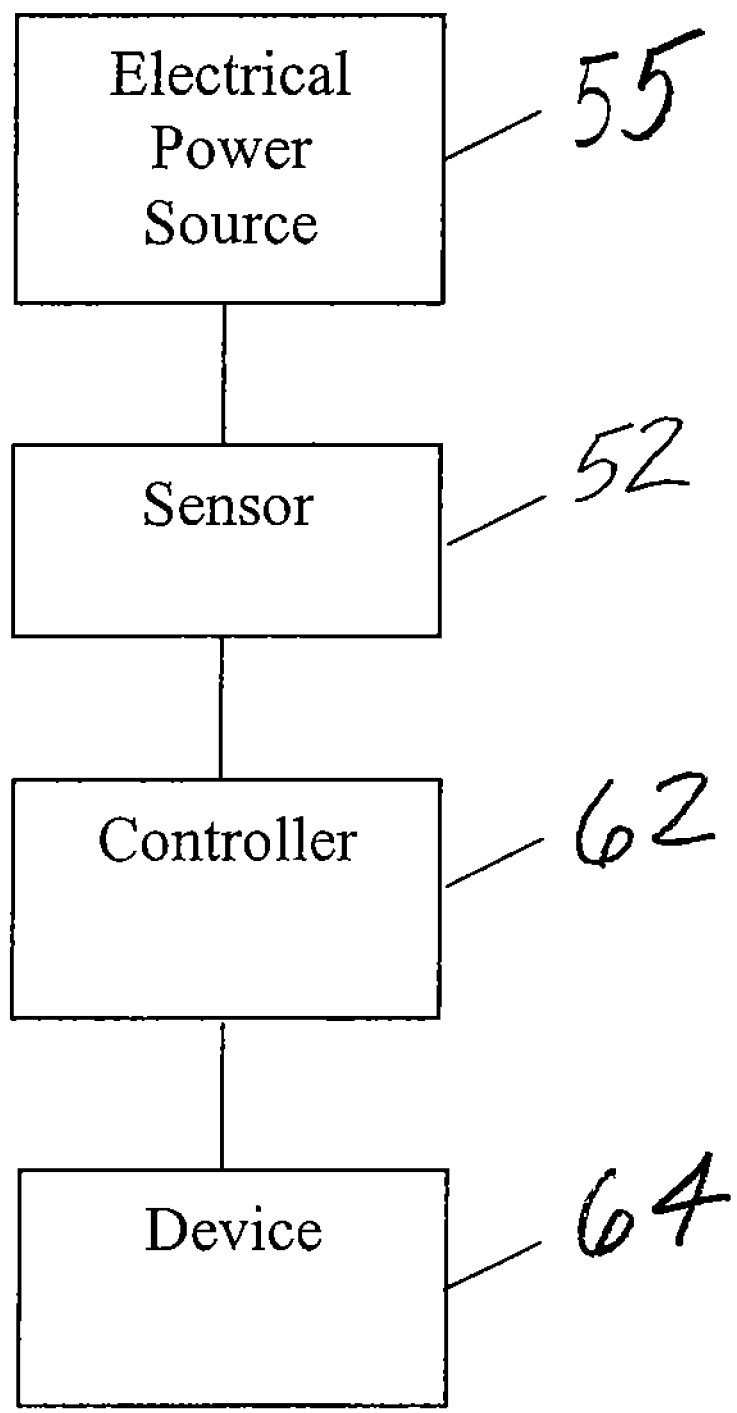
FIG. 7 is a diagram of components used with the present invention.

FIG. 7 shows a simplistic operational diagram of components associated with sensor 52 of the present invention. An electrical power source 55 from existing electrical wiring already contained in the baler provides electrical power to sensor 52 through conduit 54 (FIG. 4). For simplicity, conduit 54 also includes any additional electrical wiring required for the interaction of sensor 52 with other baler components. In one embodiment of operation of sensor 52, sensor 52 senses the reflectance of a predetermined area an end region 72 of a forming bale 70 (FIG. 8), and provides a signal pulse or indication (not shown) corresponding to the amount of the predetermined area covered by crop components 56 (FIGS. 5, 6) to a controller 62. The strength or intensity of the reflective signal pulse is related to the amount of coverage of the crop components 56. For example, in one embodiment, a substantially full strength reflected signal corresponds to a large number of crop components 56 over the sensed predetermined area. In another embodiment, the sensed area is smaller than a single piece of crop. In this manner the sensed signal indicates a high or low signal indicating whether a piece of crop is in the viewing area or not. Controller 62 receives the signal pulse or indication and manipulates, for example, sums and averages signal pulse intensity levels or high/low indications received from sensor 52 during a predetermined period of time. The predetermined period of time can related to the speed associated with the periphery of the forming bale and the speed in which sensor 52 can send signal pulses or indications sufficient to permit accurate measurement of the crop components 56. In one embodiment, sets of signal pulses or indications are produced by sensor 52 at a rate of 50 Hz, although the sensor could operate at different rates depending on the desired accuracy.

After manipulating the signal pulse intensity levels or indications received from sensor 52, controller 62 calculates a density value for each end region 72 of the forming bale 70 (FIG. 8). As further shown by FIG. 7, controller 62 provides the density values to a device 64 for alerting and conveying the density values to an operator. Device 64 can be a display device, audio device, or a combination of both. In other words, device 64 can provide, for example, a bar graph showing the edge density values corresponding to each end of the bale or other pictorial representation, accompanied by a numerical value mass per unit volume, or both. Alternately, or in addition, audio signals, such as an audio message containing the numerical mass per unit volume value for each end, or a certain audio frequency correlating to a range of edge density values, can be conveyed to the operator. In addition, any combination of this information can be provided to the operator along with the size, i.e., diameter, of the forming bale, which is obtained by other means and not discussed further herein.

In one embodiment, controller 62 includes a comparator (not shown) that compares the density values for each end region of the bale to permit monitoring of the cylindrical profile of the bale, i.e., attain or maintain a desired correlation between the density values. Since it is typically desirable for the bales to be cylindrical, which is usually the result of the bales being of uniform density, the comparator compares the density values for each end region of the bale. The comparator can convey such comparison of the edge density values by device 64, such as by changing the color of the bar graphs to indicate a difference between the edge density values exceeding a predetermined value. Alternately, or in addition, directional arrows can be provided to alert the operator to reposition the baler to maintain the cylindrical profile of the bale. That is, in response to one edge density value being less than the other, an arrow is displayed to induce the operator to alter the path of the baler with respect to the windrow, in an effort to provide a higher concentration of crop to the end having the lower edge density value. In one embodiment, the comparator automatically initiates a repositioning of the baler in response to a sufficient difference between the two edge density values.

It is to be understood that sensors 56 and controllers 62 can also manipulate signal pulse intensity levels or indications received relating to central region 74 (FIGS. 8, 9). However, typically, the density values associated with central region 74 are greater than the density values associated with end regions 72 (FIGS. 8, 9).

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A rotary baler for forming cylindrical bales composed of a harvested crop, the rotary baler of the type having a bale-forming chamber which is expandable during bale formation, the rotary baler comprising:
   at least two sensors disposed in the chamber, each sensor configured to indicate the presence of crop components corresponding to a predetermined area along an end region of the bale by emitting wave-lengths from the sensor onto the predetermined area and measuring the absorbance or reflectance of the wavelengths; and
   a controller configured to receive the indications from each sensor and calculate a density value for each end region of the bale to permit monitoring of the cylindrical profile of the bale.

2. The rotary baler of claim 1 wherein the controller permits the formation of the bale having substantially uniform density.

3. The rotary baler of claim 1 wherein the sensors use at least one wavelength within the electromagnetic spectrum.

4. The rotary baler of claim 3 wherein at least one of the sensors is an ultraviolet sensor.

5. The rotary baler of claim 3 wherein at least one of the sensors is an infrared sensor.

6. The rotary baler of claim 1 further comprises a comparator to compare the density values of each end region of the bale.

7. The rotary baler of claim 6 wherein the comparator is configured to automatically compare the density values of each end region of the bale and initiate a repositioning of the rotary baler to maintain the cylindrical profile of the bale.

8. The rotary baler of claim 6 further comprises a device to alert an operator of the density values.

9. The rotary baler of claim 8 wherein the device is a display device.

10. The rotary baler of claim 8 wherein the device is an audio device.

11. A bale shape indicator comprising:
    a wavelength emitting sensor configured for use with a substantially cylindrical bale being formed, to indicate and transmit data regarding, in a non-contacting manner, the presence of crop components corresponding to a predetermined area of an end region of the bale by emitting wavelengths from the sensor onto the predetermined area and measuring the absorbance or reflectance of the wave lengths, the data capable of being manipulated to determine a density value for the end region of the bale.

12. The bale shape indicator of claim 11 wherein a controller manipulates the data.

13. The bale shape indicator of claim 11 wherein the sensor uses at least one wavelength within the electromagnetic spectrum.

14. The bale shape indicator of claim 13 wherein the sensor is an ultraviolet sensor.

15. The bale shape indicator of claim 13 wherein the sensor is an infrared sensor.

16. The bale shape indicator of claim 11 further comprises a second sensor configured to indicate, in a non-contacting manner, the presence of crop components corresponding to a predetermined area of an end region of the bale opposite the end region associated with the sensor.

17. The bale shape indicator of claim 16 further comprises a comparator to compare the density values of each end region of the bale.

18. The bale shape indicator of claim 17 further comprises a device to alert an operator of the density values.

19. The bale shape indicator of claim 18 wherein the device is a display or audio device.

20. A method of forming substantially cylindrical bales in a baler of the type having a crop pickup and a bale-forming chamber which is expandable during bale formation, the method comprising the steps of:
    positioning the baler to pick up crop material with the pickup;
    feeding the picked up crop material into the expandable bale-forming chamber;
    sensing, in a non-contacting manner in the bale-forming chamber, the presence of crop components corresponding to a predetermined area for each of opposed end regions of the bale;
    manipulating the sensed presence of crop components to determine a density value for each end region of the bale;
    comparing the density values; and
    repositioning the baler in response to the comparison of density values to attain or maintain a desired correlation between the density values.

* * * * *